(12) United States Patent
Yudanov

(10) Patent No.: US 10,443,546 B2
(45) Date of Patent: Oct. 15, 2019

(54) FUEL STORAGE SYSTEM

(71) Applicant: VOLVO TRUCK CORPORATION, Göteborg (SE)

(72) Inventor: Sergi Yudanov, Västra Frölunda (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 193 days.

(21) Appl. No.: 15/524,165

(22) PCT Filed: Nov. 28, 2014

(86) PCT No.: PCT/SE2014/000142
§ 371 (c)(1),
(2) Date: May 3, 2017

(87) PCT Pub. No.: WO2016/085370
PCT Pub. Date: Jun. 2, 2016

(65) Prior Publication Data
US 2017/0314511 A1 Nov. 2, 2017

(51) Int. Cl.
*F02M 21/02* (2006.01)
*B60K 15/04* (2006.01)
(Continued)

(52) U.S. Cl.
CPC ... *F02M 21/0212* (2013.01); *B60K 15/03006* (2013.01); *B60K 15/04* (2013.01);
(Continued)

(58) Field of Classification Search
CPC .......... F02M 21/0212; F02M 21/0242; F02M 21/0221; F02M 21/02; F02M 21/0236;
(Continued)

(56) References Cited

U.S. PATENT DOCUMENTS 3,769,952 A 11/1973 Fiedler et al.
5,411,058 A 5/1995 Welsh et al.
(Continued)

FOREIGN PATENT DOCUMENTS

CN 1412428 A 4/2003
DE 102008063563 A1 6/2009
(Continued)

OTHER PUBLICATIONS

International Search Report (dated Aug. 24, 2015) for corresponding International App. PCT/SE2014/000142.
(Continued)

*Primary Examiner* — Timothy L Maust
(74) *Attorney, Agent, or Firm* — Withrow & Terranova, PLLC

(57) ABSTRACT

A fuel storage system is provided for storing dimethylether (DME), a blend including DME, or other similar highly volatile fuel at a vehicle. The fuel storage system including a main storage tank, an expansion tank, a fuel filling receptacle configured to receive a fuel filling nozzle of a filling station, and a valve arrangement having at least a normal operating setting and a fuel filling setting. The valve arrangement in the normal operating setting provides a fuel passage between the main storage tank and the expansion tank, and the valve arrangement in the fuel filling setting both provides a fuel passage between the fuel filling receptacle and the main storage tank and prevents fuel flow between the main storage tank and the expansion tank. The fuel storage system is configured to mechanically prevent disconnection of the fuel filling nozzle from the fuel filling receptacle unless the valve arrangement is in the normal operating setting. A corresponding method, as well as a further example embodiment of the fuel storage system, are also provided.

30 Claims, 8 Drawing Sheets

(51) Int. Cl.
*B60K 15/03* (2006.01)
*F17C 5/02* (2006.01)
*F17C 13/04* (2006.01)
*B67D 7/04* (2010.01)
*B60K 15/063* (2006.01)

(52) U.S. Cl.
CPC ............ *B67D 7/0401* (2013.01); *F02M 21/02* (2013.01); *F02M 21/0221* (2013.01); *F02M 21/0242* (2013.01); *F17C 5/02* (2013.01); *F17C 13/04* (2013.01); *B60K 15/063* (2013.01); *B60K 2015/03019* (2013.01); *B60K 2015/03026* (2013.01); *B60K 2015/03171* (2013.01); *B60K 2015/03368* (2013.01); *B60K 2015/03375* (2013.01); *B60K 2015/03394* (2013.01); *B60Y 2200/1422* (2013.01); *F02M 21/023* (2013.01); *F02M 21/0224* (2013.01); *F02M 21/0236* (2013.01); *F17C 2205/0326* (2013.01); *F17C 2205/0332* (2013.01); *F17C 2205/0335* (2013.01); *F17C 2221/035* (2013.01); *F17C 2260/022* (2013.01); *F17C 2260/044* (2013.01); *F17C 2265/065* (2013.01); *Y02T 10/32* (2013.01)

(58) Field of Classification Search
CPC ............ F02M 21/0224; F02M 21/023; B60K 15/03006; B60K 15/04; B60K 2015/0332; B60K 2015/03026; B60K 2015/03171; B60K 2015/03368; B60K 15/063; F17C 5/02; F17C 13/04; F17C 2205/0332; F17C 2205/0335; F17C 2265/065; F17C 2260/022; F17C 2221/035; F17C 2260/044; B67D 7/0401; B60Y 2200/1422; Y02T 10/32
See application file for complete search history.

(56) References Cited

U.S. PATENT DOCUMENTS

| | | | | |
|---|---|---|---|---|
| 6,016,834 A * | 1/2000 | Leidl | ............... | B60K 15/01 137/102 |
| 6,929,039 B2 * | 8/2005 | Vaitses | ............... | B63B 11/04 114/343 |
| 6,945,273 B2 | 9/2005 | Reid | | |
| 6,962,177 B1 * | 11/2005 | McCommons | ........ | B67D 7/064 141/383 |
| 7,000,657 B1 * | 2/2006 | Thorpe | ............... | B67D 7/065 141/207 |
| 7,017,630 B2 * | 3/2006 | Dikken | ............... | B67D 7/3209 141/386 |
| 7,575,028 B2 * | 8/2009 | Thorpe | ............... | B67D 7/065 141/207 |
| 2013/0112295 A1 * | 5/2013 | McNicholas | ........ | F17C 13/02 137/551 |

FOREIGN PATENT DOCUMENTS

| | | |
|---|---|---|
| EP | 0039977 A1 | 11/1981 |
| JP | H06278482 A | 10/1994 |
| JP | 2004130919 A | 4/2004 |
| WO | 9502554 A1 | 1/1995 |

OTHER PUBLICATIONS

International Preliminary Report on Patentability (dated Nov. 17, 2016) for corresponding International App. PCT/SE2014/000142.
Japanese Official Action (dated Sep. 11, 2018) for corresponding Japanese App. 2017-528444.
European Search Report (dated Mar. 16, 2018) for corresponding European App. EP 14 90 6874.
Chinese Official Action (dated Feb. 2, 2019) for corresponding Chinese App. 201480083689.7.

* cited by examiner

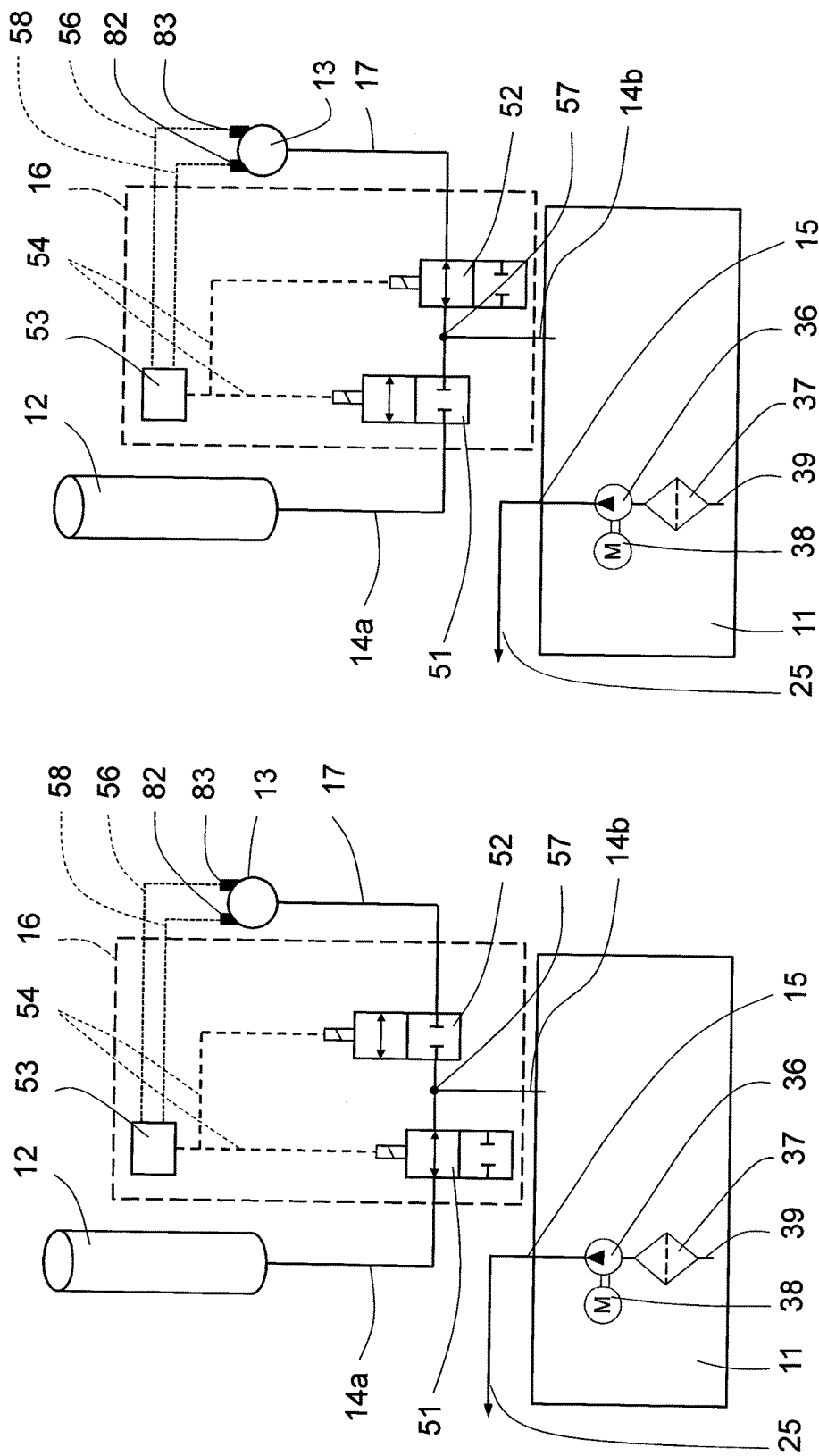

FUEL STORAGE SYSTEM

BACKGROUND AND SUMMARY

The invention relates to a fuel storage system for storing dimethylether (DME), blends thereof, or other similar highly volatile fuels, such as LPG (liquefied petroleum gas), propane, butane, on a vehicle. The fuel storage system comprises a main storage tank, an expansion tank, a fuel filling receptacle configured to receive a fuel filling nozzle of a filling station, and a valve arrangement having at least a normal operating setting and fuel filling setting. The valve arrangement provides a fuel passage between the main storage tank and the expansion tank in the normal operating setting, and the valve arrangement provides a fuel passage between the fuel filling receptacle and the the thin storage tank in the fuel filling setting.

The fuel storage system is particularly suitable for storing and supplying DME fuel. The combustion engine is preferably of the compression-ignition type, such as a diesel engine. The engine is preferably provided in a heavy vehicle, such as a heavy truck, a construction vehicle, a bus or a boat, but the invention is not limited to these vehicle types and may also be used for automobiles or fixed engine installations, such as power source for a fixed electrical generator or fixed hydraulic pump.

Rising prices of crude oil-derived fuel and fears of its effect on our climate as well as of its imminent shortages have led to further developments in production processes of alternative fuels and internal combustion engines for their use. One potentially important renewable fuel that can be effectively produced from a variety of stocks including biomass is dimethylether (DME) or other similar highly volatile fuel. With its soot-free combustion and high cetane number, DME is very well suited for diesel type internal combustion processes. However, DME has certain drawbacks in terms of fuel storage on a vehicle compared with conventional fuels like diesel and gasoline. Document U.S. Pat. No. 6,016,834 discloses a fuel storage system designed for storing propane as a fuel on a vehicle.

One drawback with DM E or DME-like fuels is that a significantly larger fuel volume needs to be stored for the vehicle to attain a certain mileage per single fill-up. Many types of vehicles have quite limited continuous space for a larger fuel tank installation, which then effectively limits the driving range. The problem is exacerbated by the relatively high thermal expansion coefficient of DME-like fuels, which usually further limits the effective volume of fuel that can be stored in a single tank.

DME, some blends thereof and similar highly volatile fuels, such as LPG (liquefied petroleum gas), propane, butane, etc. have a relatively high thermal expansion coefficient. That means that the volume of a certain amount of liquid fuel increases (expands) significantly when the temperature of the liquid fuel increases. This must be taken into account when the fuel is stored in a vehicle that is designed to operate in a relatively large ambient temperature range, such as typically from about −40° C. up to +50° C. Direct exposure of the fuel tank to sun light can additionally drive the temperature of the fuel stored within the tank even higher. Filling up the entire storage volume of a fuel tank with relatively cold liquid DME fuel and subsequently allowing the fuel to heat up within the fuel tank will thus generate a significant pressure increase within the fuel tank, which therefore risks bursting the tank and/or bleeding of fuel into the atmosphere.

One attempt to increase the effective volume of the fuel storage tank is known from U.S. Pat. No. 6,016,834, where an expansion tank capable of relieving possible overpressure in the main tank due to thermal expansion of the fuel is provided, and thus enabling a more complete filling up of the main tank. However, this particular prior art system fails to ensure a fail-safe and reliable enough system that would be adequately protected against human error and/or valve wear and filling station parameter variability potentially causing over-filling of the expansion tank, safety and vehicle reliability-related issues, and environmental pollution.

It is desirable to provide a fuel storage system and method for refuelling a fuel storage system for DME fuel or other similar highly volatile fuel, which fuel storage system and method provides improved safety in connection with refuelling of the fuel storage system.

According to a first aspect of the invention, a fuel storage system is provided. The fuel storage system is suitable for storing dimethylether (DME) or other similar highly volatile fuel on a vehicle. The fuel storage system comprises a main storage tank, an expansion tank, a fuel filling receptacle configured to receive a fuel filling nozzle of a filling station, and a valve arrangement having at least a normal operating setting and a fuel filling setting, wherein the valve arrangement in the normal operating setting provides a fuel passage between the main storage tank and the expansion tank, and wherein the valve arrangement in the fuel filling setting both provides a fuel passage between the fuel filling receptacle and the main storage tank and prevents fuel flow between the main storage tank and the expansion tank, wherein the fuel storage system is configured to mechanically prevent disconnection of the fuel filling nozzle from the fuel filling receptacle unless the valve arrangement is in the normal operating setting.

According to a second aspect of the invention, a method for refuelling a fuel storage system is provided. The fuel storage system comprises a main storage tank, an expansion tank, a fuel filling receptacle configured to receive a fuel filling nozzle of a filling station, and a valve arrangement having at least a normal operating setting and a fuel filling setting, wherein the valve arrangement in the normal operating setting provides a fuel passage between the main storage tank and the expansion tank, and wherein the valve arrangement in the fuel filling setting both provides a fuel passage between the fuel filling receptacle and the main storage tank and prevents fuel flow between the main storage tank and the expansion tank. The method comprising inserting the fuel filling nozzle into the fuel filling receptacle; locking the fuel filling nozzle in the fuel filling receptacle, such that the fuel filling nozzle is mechanically prevented from disconnection from the fuel filling receptacle, wherein the valve arrangement automatically is set in the fuel filling setting; refuelling the main storage tank; and unlocking and removing the fuel filling nozzle from the fuel filling receptacle, wherein the valve arrangement automatically is set in the normal operating setting.

By the provision of a fuel storage system and associated method for refuelling the fuel storage system of claims 1 and 35, increased safety against overfilling of the fuel storage system is enabled. Fuel storage systems comprising a main storage tank, an expansion tank and a valve arrangement controlling a fuel passage between the main storage tank and the expansion tank may become overfilled either if both the main and expansion tank becomes completely filled, or if the expansion tank is empty after refuelling but the fuel passage is closed, such that the fuel in the main storage tank is prevented to expand into the expansion tank.

The main function and safety feature of this invention is to prevent operating the vehicle, i.e. driving away from the filling station, when the fuel passage connecting the main tank and the expansion tank is still closed. The feature consequently makes it impossible for the vehicle to leave the filling station unless the fuel passage connecting the main storage tank with the expansion tank is open again. An open fuel passage allows fuel in the main storage tank to expand into the expansion tank upon increased fuel temperature, thereby reducing the risk for damages to the fuel storage system and/or release of fuel into the atmosphere.

According to one example embodiment, the valve arrangement may be prevented from changing setting from normal operating setting to fuel filing setting unless the fuel filling nozzle is inserted in the fuel filling receptacle. This has the advantage that the fuel passage between the main storage tank and expansion tank is not closed accidentally or by human error during normal operating setting, i.e. at times between fuel filling events. Such accidental closure of said fuel passage would prevent any fluid flow to the expansion tank and would therefore result in a safety risk.

According to a further example embodiment, the fuel storage system may further comprise a mechanical locking device located adjacent the fuel filling receptacle and configured to selectively lock the fuel filling nozzle in the fuel filling receptacle. This subject-matter represents one example embodiment for how fuel storage system is able to mechanically prevent disconnection of the fuel filling nozzle from the fuel filling receptacle under certain conditions.

According to a further example embodiment, the mechanical locking device may control the setting of the valve arrangement. That is, the actual operating position of the mechanical locking device controls the setting of the valve arrangement, such that manual or non-manual adjustment of the operating position from locked to unlocked operating position, or vice-versa, automatically may result in a change of setting of the valve arrangement. This is advantageous in view of enabling simplified handling of the fuel storage system since only the operating position of the mechanical locking device must be controlled, whilst the setting of the valve arrangement is automatic. A user does thus not necessarily need to directly control both the mechanical locking device and the valve arrangement individually.

According to a further example embodiment, the fuel storage system may compromise a mechanical linking mechanism connecting the mechanical locking device with the valve arrangement, such that the actuating position of the mechanical locking device automatically may control the setting of the valve arrangement. As mentioned above, the automatic control of the valve arrangement setting enables simplified handling of the fuel storage system.

According to a further example embodiment, the mechanical linking mechanism may automatically set the valve arrangement in the fuel filing setting when the mechanical locking device is set in a locking position. This has the advantage of reducing the risk for filling the expansion tank during refuelling, such that improved safety is realised.

According to a further example embodiment, the mechanical linking mechanism may automatically set the valve arrangement in the normal operating condition when the mechanical locking device is set in a release position. This has the advantage of reducing the risk of the vehicle driving off from the filling station with the fuel passage between the expansion tank and main storage tank in a closed state, such that improved safety is realised.

According to a further example embodiment, the mechanical locking device may be prevented from entering a locking position unless the fuel filling nozzle is inserted in the fuel filling receptacle. This has the advantage of preventing accidental or erroneous switching of the mechanical locking device into the locking position when the fuel filling nozzle is not inserted, e.g. during normal use of the vehicle, such that the flow passage between the expansion tank and main storage tank does not accidentally becomes closed during any events not being a refuelling event.

According to a further example embodiment, the fuel storage system may further comprise a locking member located at the fuel filling receptacle and configured for being actuated from a locking position to a release position by the fuel filling nozzle upon insertion thereof in the fuel filling receptacle, and the locking member may interact with the mechanical linking mechanism or the mechanical locking device such that mechanical locking device is prevented from entering a locking position unless locking member is in the release position. This subject-matter represents one example embodiment for preventing the mechanical locking device from entering a locking position unless the fuel filling nozzle is inserted in the fuel filling receptacle.

According to a further example embodiment, the locking member may be configured for being slidingly moved by the fuel filling nozzle upon insertion thereof in the fuel filling receptacle. Automatic sliding, i.e. change of operating position, of the locking member during insertion of the fuel filling nozzle enables simplified handling of the fuel storage system.

According to a further example embodiment, the locking member ma be preloaded towards the locking position by means of resilient means, such as a mechanical spring. A mechanical spring ensures a robust design and avoids an uncertain actuating position of the locking member.

According to a further example embodiment, the valve arrangement may comprise at least one moveable valve member for controlling the flow through the valve arrangement, and the mechanical linking mechanism may be connected to the at least one moveable valve member. Use of a mechanical linking mechanism for establishing the necessary control motion of the moveable valve member provides a robust, reliable and cost-effective solution that does not necessarily involve electro-mechanical components for controlling the position of the valve member.

According to a further example embodiment, the valve arrangement may comprise a three-way valve connected to the fuel filling receptacle, the main storage tank and the expansion tank, and the three-way valve may provide a fuel passage between the main storage tank and the expansion tank in the normal operating setting and a fuel passage between the fuel filling receptacle and the main storage tank in the fuel filling setting. A single three way valve having two different operating settings enables further improved user friendliness because the number of possible valve settings is reduced, and the shift between normal operating setting and fuel filling setting is realised by control of said single three-way valve.

According to a further example embodiment, the setting of the valve arrangement may be configured to be changed manually. This enables a cost-efficient and reliable system.

According to a further example embodiment, the fuel storage system may further comprise an outlet fuel line for supplying fuel to a combustion engine, and the outlet fuel line may be connected to a fuel outlet of the main storage tank. With this arrangement it is enabled to configure the fuel storage system such that fuel in the expansion tank is returned back to the main storage tank as soon as there is sufficient volume available, since the last remaining fuel in the entire fuel storage system preferably is located at the location of the fuel outlet of the fuel storage system. This is advantageous in terms of increasing the likelihood that the expansion tank is empty when refuelling occurs, i.e. when there is a low fill level in the fuel storage system, for ensuring that the required expansion space for the fuel is available when needed, that is when the fill level of the main storage tank is relatively high.

According to a further example embodiment, the expansion tank may be located higher than the main storage tank for enabling automatic return of fuel from the expansion tank to the main storage tank by means of gravitational force. This arrangement avoids the need for other more complex and expensive solutions for returning fuel from the expansion tank to the main storage tank, such as use of a fuel transfer pump.

According to a further example embodiment, the expansion tank and the main storage tank may be physically separate fuel tanks having no common side walls. This arrangement enables improved packing of the vehicle, for example in case there is a lack of space in the area of the main storage tank. The expansion tank may be located displaced from the main storage tank at a location where more space is available, and being connected to the main storage tank by means of an expansion tank fuel line.

According to a further example embodiment, the fuel storage system may further comprise a fuel feed pump, preferably submerged in the liquid fuel in the tank, for feeding fuel from main storage tank to the outlet fuel line. This arrangement reduces the risk for fuel vaporisation in the outlet fuel line.

According to a further example embodiment, the fuel storage system may be configured to store dimethylether (DME) or other similar highly volatile fuel. The low vaporisation level in terms of pressure and temperature of the fuel implies that the fuel is stored under pressure in the fuel tank, and is conveyed under pressure in the fuel lines as far as possible. Moreover, fuel cooling arrangements are preferably also included to avoid that the temperature of the fuel increases too much.

According to a further example embodiment, a solenoid shut-off valve, optionally with an automatic relief function, may be provided in a fuel line connected to the main storage tank and/or the expansion tank. Such shut-off valve may be advantageous in terms of reduced fuel vapour leakage from the main storage tank and/or expansion tank during engine standstill. The solenoid shut-off valves are configured to be set in a continuous open state during engine operating state and close only upon engine shut-down. Due to the relatively low number of opening/closing events, the sealing arrangement of the solenoid shut-off valve can be provided with a relatively soft sealing surface, such that high sealing performance can be accomplished. Thereby, also DME fuel vapour or vapour from similar fuels are effectively prevented from leaking out from the fuel tanks and migrate along the fuel lines during engine still stand. DME fuel vapour is highly volatile and tend to migrate past non-precise, worn, valves with metal sealing seats, and possibly further into various fuel components, such as fuel pumps, fuel filters, etc., thereby potentially impairing their functionality.

According to a further example embodiment, a solenoid shut-off valve with or without an automatic relief function may be provided in an expansion tank fuel line connecting the valve arrangement and the expansion tank. In case the solenoid shut-off valve comprises an automatic relief function the valve may be configured to relieve pressure in the expansion tank fuel line connecting the valve arrangement and the expansion tank, into the expansion tank.

According to a further example embodiment, a solenoid shut-off valve with or without automatic relief function may be provided in a return fuel line connected to the main storage tank and configured for returning recirculated fuel from a combustion engine into the main storage tank. In case the solenoid shut-off valve comprises an automatic relief function the valve may be configured to relieve pressure in the return fuel line connecting the engine and the main storage tank, into the main storage tank.

According to a further example embodiment, an inlet fuel line configured for supplying fuel from the valve arrangement to the main storage tank may be connected to the return fuel line at a location between the solenoid shut-off valve and the engine. Thereby, a single solenoid shut-off valve with or without automatic relief function may be used for both the return fuel line and inlet fuel line.

According to a further example embodiment, a solenoid shut-off valve with or without automatic relief function may be provided in an inlet fuel line connecting the valve arrangement and the main storage tank, which inlet fuel line may be configured for supplying fuel from the valve arrangement to the main storage tank. In case the solenoid shut-off valve is provided with automatic relief function the valve may be configured to relieve pressure in the inlet fuel line.

According to a further example embodiment, a solenoid shut-off valve with or without automatic relief function is provided in the outlet fuel line. In case the solenoid shut-off valve comprises an automatic relief function the valve may be configured to relieve pressure in the outlet fuel line connecting the engine and the main storage tank, into the main storage tank.

According to a further example embodiment, the fuel storage system may comprise a safety valve configured to open and relieve pressure from the main storage tank to the atmosphere when the pressure in the main storage tank exceeds a predetermined limit. The safety valve consequently ensures that no damages to the fuel storage system occur due to excessive fuel pressure within the fuel storage system.

According to a further example embodiment, the fuel storage system may further comprise a check and relief valve connected to the main storage tank and the inlet fuel line, wherein the check and relief valve may be adapted to allow a relief of pressure from the main storage tank to the expansion tank. This check and relief valve may be important in situations where a solenoid shut-off valve is provided in the inlet fuel line and effectively stopping fuel flow from the main storage tank to the expansion tank in the engine stillstand mode. The check and relief valve could enable fuel expansion fuel flow from the main storage tank to the expansion tank via the check and relief valve.

According to a further example embodiment, the fuel storage system comprises both a check and relief valve connected to the main storage tank and the inlet fuel line and a solenoid shut-off valve provided in the expansion tank fuel line, and both are adapted to allow a relief of pressure from the main storage tank to the expansion tank. In case a solenoid shut-off valve is provided in the expansion tank fuel line, the solenoid shut-off valve tends to prevent flow of fuel in and out from the expansion tank. However, in order to enable fuel expansion flow from the main storage tank to the expansion tank during engine stillstand, the solenoid shut-off valve in the expansion tank fuel line may be provided with an automatic relief function for enabling fuel flow from the main storage tank to the expansion tank via both the check and relief valve and the solenoid shut-off valve.

According to a further example embodiment, at least the check and relief valve, and optionally also the solenoid shut-off valve provided in the expansion tank fuel line, may be adapted to allow a relief of pressure from the main storage tank to the expansion tank at a pressure level below an opening pressure of the safety valve. This arrangement essentially enables thermal expansion caused fuel flow from the main storage tank to the expansion tank also during engine shut-down.

According to a further example embodiment, fuel storage system may further comprise a filling check valve installed in the main storage tank and connected to an inlet line configured for supplying fuel from the valve arrangement to the main storage tank, wherein said filling check valve may be adapted to open and increase the filling rate of the main storage tank when the feed pressure in the inlet fuel line exceeds a predetermined level.

According to a further example embodiment, the fuel storage system may comprise two, three or more main storage tanks, and said main storage tanks may be connected to the same valve arrangement.

It is also desirable to provide a fuel storage system for DME fuel or other similar highly volatile fuel, which fuel storage system provides reduced design complexity of the fuel storage system. According to a further aspect of the invention a fuel storage system is provided. The fuel storage system is suitable fir storing dimethylether (DME) or other similar highly volatile fuel on a vehicle. The fuel storage system comprises a main storage tank, an expansion tank, and an outlet fuel line configured for supplying fuel to a combustion engine. The outlet fuel line is connected to a fuel outlet of the main storage tank and the expansion tank is located higher than the main storage tank for enabling automatic return of fuel from the expansion to main tank by means of gravitational force. This arrangement avoids the need for other more complex and expensive solutions for returning fuel from the expansion tank to the main storage tank, such as use of a fuel transfer pump.

By the provision of the fuel storage system, any fuel expanded into the expansion tank from the main storage tank due to thermal expansion of the fuel may simply automatically flow back to the main storage tank when sufficient storage volume is available in the main storage tank. The return flow, driven by gravity force, eliminates need for additional return pumping means, such as a fuel transfer pump, and all control mechanisms associated thereto. The fuel storage system thus provides a main and expansion tank system with high reliability, high robustness and low cost, i.e. a fuel storage system with a reduced design complexity.

According to a further example embodiment, the fuel storage system may further comprise a fuel filling receptacle configured to receive a fuel filling nozzle of a filling station, and a valve arrangement having at least a normal operating setting and fuel filling setting, wherein the valve arrangement set in the normal operating setting may provide a fuel passage between the main storage tank and the expansion tank, and wherein the valve arrangement in the fuel filling setting may both provide a fuel passage between the fuel filling receptacle and the main storage tank and prevent fuel flow between the main storage tank and the expansion tank. Thereby, increased safety against overfilling of the fuel storage system is enabled.

Fuel storage systems comprising a main storage tank, an expansion tank and a valve arrangement controlling a fuel passage between the main storage tank and the expansion tank may become overfilled either if both the main and expansion tank becomes completely filled, or if the expansion tank is empty after refuelling but the fuel passage is closed, such that the fuel in the main storage tank is prevented to expand into the expansion tank. The main function and safety feature of this invention is to prevent operating the vehicle, i.e. driving away from the filling station, when the fuel passage connecting the main tank and the expansion tank is still closed. The feature consequently makes it impossible for the vehicle to leave the filling station unless the fuel passage connecting the main storage tank with the expansion tank is open again. An open fuel passage allows fuel in the main storage tank to expand into the expansion tank upon increased fuel temperature, thereby reducing the risk for damages to the fuel storage system and/or release of fuel into the atmosphere.

According to a further example embodiment, the fuel storage system may be configured to mechanically prevent disconnection of the fuel filling nozzle from the fuel filling receptacle unless the valve arrangement is in the normal operating setting. This arrangement ensures that the vehicle cannot be driven off with a closed fuel passage between the main storage tank and expansion tank.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 5 is a further example embodiment of the fuel storage system, FIG. 6 is a further example embodiment of the fuel storage system.

DETAILED DESCRIPTION

Various aspects of the invention will hereinafter be described in conjunction with the appended drawings to illustrate and not to limit the invention. Variations of the inventive aspects are not restricted to the specifically shown example embodiments, but are applicable on other variations of the invention. Like designations denote like elements.

Figure 1:
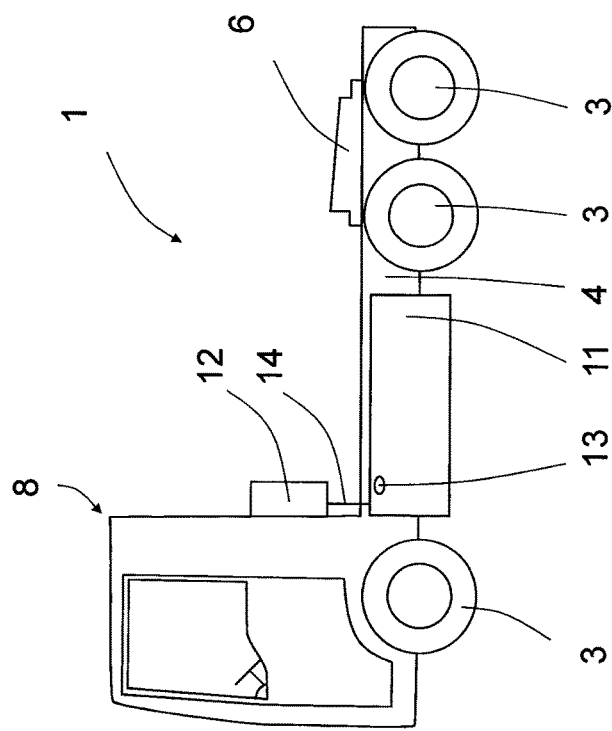
FIG. 1 is a vehicle comprising an example embodiment of the fuel storage system.

FIG. 1 shows an example embodiment of a vehicle 1 in which the invention may be implemented. In this example, the vehicle 1 is a truck but the invention would be equally advantageously implemented in any other vehicle, such as buses and automobiles. In this example embodiment, the vehicle comprises rigid frame 4, front and rear wheels 3, a driver's cabin 8 and a load carrying arrangement 6 adapted to be coupled to a trailer.

The vehicle of FIG. 1 further comprises an example embodiment of a fuel storage system comprising a main storage tank 11 attached to the frame 4, a refill receptacle 13 located adjacent the main storage tank 11, and a separate expansion tank 12 located above the main storage tank 11 such that fuel expanded into the expansion tank 12 may flow back to the main storage tank 11 automatically when sufficient volume is available therein.

The expansion tank 12 may for example be attached to the rear wall of the driver's cabin 8, as schematically illustrated in FIG. 1. A fuel line 14 connecting the main storage tank 11 and the expansion tank 12 is also provided for enabling fuel flow between said tanks 11, 12. The expansion tank 12 and the main storage tank 11 are physically separate fuel tanks having common side walls.

The expansion tank 12 may be located higher than the main storage tank 11 for enabling automatic return of fuel from the expansion tank 12 to main storage tank 11 by means of gravitational force.

One or both of the main storage tank 11 and expansion tank 12 may for example be made as a relatively simple steel fuel tank similar to the type used for storing propane. DME fuel is typically stored at ambient temperature in liquid state in the fuel tanks 11, 12. This is possible when the DME fuel is stored with a certain internal tank pressure, such as for example about 75 psi.

Figure 2:
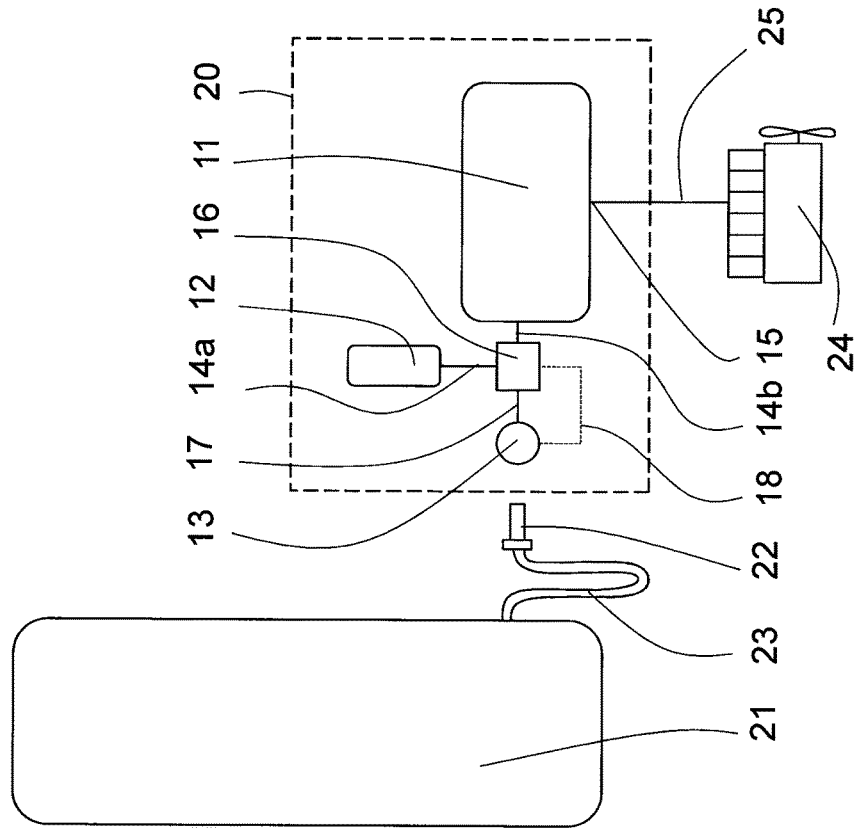
FIG. 2 is an example embodiment of the fuel storage system.

FIG. 2 schematically shows an example embodiment of a fuel storage system 20 and the components with which the system 20 normally occasionally or permanently interacts, namely a fuel filling station 21 and a combustion engine 24. The fuel filling station 21 comprises a fuel tank 21, a fuel filling nozzle 22 and a fuel hose 23 connecting the fuel filling nozzle with the fuel tank 21. For refuelling of the main storage tank 11 the vehicle is typically driven to the filling station, the fuel filling nozzle is connected to the fuel filling receptacle 13 and transfer of fuel from the fuel tank 21 to the main storage tank 11 is performed. After completed filling the fuel filling nozzle is disconnected and removed from the main fuel filling receptacle 13 and the vehicle is ready for use again.

The combustion engine 24 is connected with the main storage tank 22 via an outlet fuel line 25. The outlet fuel line 25 is typically connected to a fuel outlet 15 of the main storage tank 11 and to a fuel injection system of the combustion engine 24.

After completed refuelling it is desirable to have the storage volume of the expansion tank more or less empty for enabling use of the expansion tank as expansion volume for the fuel during potential subsequent heat-up of the fuel stored in the main storage tank 11. It is thus desirable to avoid filling of the expansion tank 12 during refuelling. However, it is also desirable to keep the fuel line 14 connecting the main storage tank 11 and the expansion tank 12 open for enabling said potential subsequent expansion whenever is may occur, e.g. during driving or vehicle stillstand. There is thus a risk that the expansion tank becomes filled during refuelling, such that both the main storage tank and expansion tank is more or less completely filled after refuelling, in which event there would be no expansion volume available during subsequent heat-up of the fuel, thereby resulting in a safety risk.

This conflicting and potentially dangerous situation is solved by means of providing the fuel storage system with a valve arrangement 16 for controlling the flow of fuel to and from the fuel filling receptacle 13, the main storage tank 11 and the expansion tank 12. In the example embodiment of FIG. 2, the valve arrangement 16 is connected to the expansion tank 12 via an expansion tank fuel line 14a, to the main storage tank 11 via an inlet fuel line 14b, and to the fuel filling receptacle via a receptacle fuel line 17.

The valve arrangement 16 comprises at least a normal operating setting and a fuel filling setting. In the normal operating setting the valve arrangement 16 is arranged to provide a fuel passage between the main storage tank 11 and the expansion tank. 12, such that fuel is free to expand into the expansion tank 12 upon fuel heat-up. However, in the fuel filling setting the valve arrangement 16 is arranged to both provide a fuel passage between the fuel filling receptacle 13 and the main storage tank 11 and prevent fuel flow between the main storage tank and the expansion tank. The valve arrangement 16 is consequently arranged to prevent any accidental and undesirable filling of the expansion tank during vehicle refuelling, while ensuring use of the expansion tank 12 as expansion volume daring other times. The expansion tank is intended to be substantially empty during begin of refuelling.

However, an additional safety risk arises from the fact that the valve arrangement 16 in the fuel filling setting prevents fuel flow between the main storage tank 11 and the expansion tank 12, because there is a risk that this flow passage is not opened after completed refuelling. Such an event could for example be caused by human error during refuelling by a driver. A closed passage to the expansion tank 12 in combination with a completely filled main storage tank 11 means that no expansion volume is available.

A solution to this problem is to configure the fuel storage system 20 to mechanically prevent disconnection of the fuel filling nozzle 22 from the fuel filling receptacle 13 unless the valve arrangement 16 is in the normal operating setting. The valve arrangement 16 provides a fuel passage between the main storage tank 11 and the expansion tank 12 in the normal operating setting, and to ensure that the vehicle does not leave the filling station without first opening the fuel passage between the main storage tank 11 and the expansion tank 12 again, disconnection of the fuel filling nozzle 22 is prevented unless the valve arrangement 16 is set in the normal operating setting.

Mechanically preventing disconnection of the fuel filling nozzle 22 from the fuel filling receptacle 13 unless the valve arrangement 16 is in the normal operating setting can be implemented in many different ways. For example, the fuel storage system may comprise a mechanical locking device located adjacent the fuel filling receptacle and configured to selectively lock the fuel filling nozzle in the fuel filling receptacle. The mechanical locking device can for example comprise locking member that is moveable between a locking position and release position, where the locking member is arranged to prevent removal of the fuel filling nozzle during the fuel filling setting. The mechanical locking device may be operated manually, or by means of an electro-mechanical actuator, or a pneumatic actuator, or the like.

Similarly, the mechanical locking device does not even have to be moveable, but magnetic force can be used instead. It is also possible to locate the mechanical locking device on the fuel filling nozzle or on an adjacent portion of the fuel filling hose 23.

Clearly, a functional link 18 must be provided between the fuel filling session and operating setting of the valve arrangement 16 for ensuring the desired return of the valve arrangement 16 to normal operating setting when the fuel filling session is terminated. The functional link 18 may be based on any of a mechanical, electrical, electro-mechanical, pneumatic or manual system, or a combination thereof.

The start and stop of a fuel filling session may be identified by means of a status change of a triggering feature of the fuel storage system. The triggering feature for temporarily setting the valve arrangement 16 in the fuel filling setting may be the placement of the fuel filling nozzle within the fuel filling receptacle, locking of the fuel filling nozzle to the fuel filling receptacle, or placement of any other part of the filling station that cannot be removed from the filling station, such as key secured to the filling station, at a specific location on the vehicle. This ensures that the vehicle cannot leave the filling station without first having removed the triggering feature that temporarily sets the valve arrangement 16 in the fuel filling setting. It is noted that the valve arrangement is here preferably arranged to return to normal operating setting upon leaving the fuel filling setting.

Figure 3:
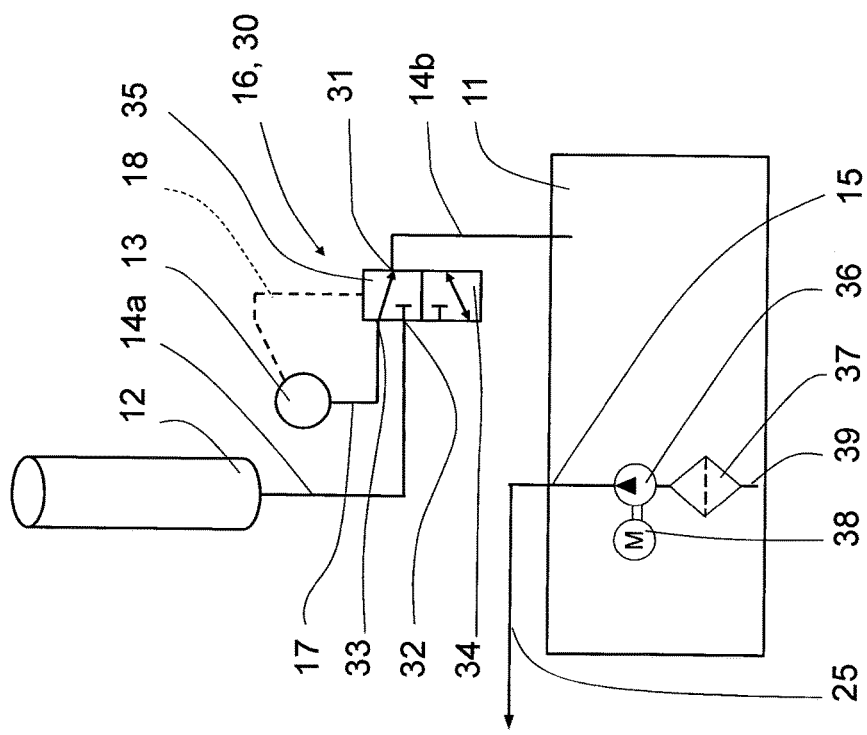
FIG. 3 is a further example embodiment of the fuel storage system.
Figure 4:
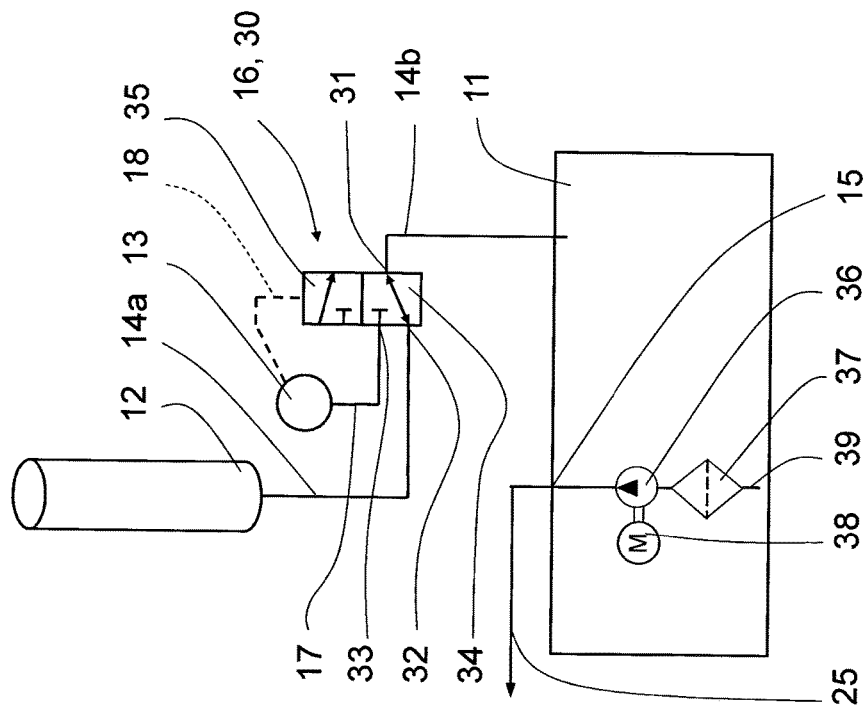
FIG. 4 is a further example embodiment of the fuel storage system.

FIGS. 3 and 4 schematically show a more detailed example embodiment of the fuel storage system, wherein the valve arrangement 16 comprises a three-way valve 30 connected to the fuel filling receptacle 13, the main storage tank 11 and the expansion tank 12. FIG. 3 shows the valve arrangement 16 in the normal operating setting, such as during vehicle standstill and running. FIG. 4 shows the valve arrangement 16 in the fuel filling setting, such as during refuelling of the main storage tank 11. The fuel filling nozzle can be connected and disconnected from the fuel filling receptacle only when the valve 30 is in the normal operating position. However, the three-way valve 30 can only change position when the filling station is connected to the vehicle, i.e. when some part of the filling station is connected to the vehicle.

A mechanical locking device (not showed) is provided adjacent the fuel filling receptacle 13 for selectively locking the fuel filling nozzle 22 in the fuel filling receptacle 13. The previously described functional link 18 between the fuel filling session and operating setting of the valve arrangement 16 is provided also here.

The three-way valve 30 is a valve comprising two operating positions 34, 35 and three ports 31, 32, 33. In a first operating position 34, which is shown in use in FIG. 3, the valve 30 provides fluid passage between a first port 31 and second port 32 and fluid blocking between the first port 31 and third port 33. In a second operating position 35, which is shown in use in FIG. 4, the valve 30 provides fluid blocking between the first port 31 and second port 32 and fluid passage between the first port 31 and third port 33.

In FIGS. 3 and 4, the first port 31 is fluidly connected to the main storage tank via an inlet fuel line 14b, the second port 32 is fluidly connected to the expansion tank 12 via an expansion tank fuel line 14a, and the third port 33 is fluidly connected to the filling receptacle 13 via a receptacle fuel line 17. The three-way valve 30 consequently provides a fuel passage between the main storage tank 11 and the expansion tank 12 when the three way valve 30 is set in the first operating position 34, which here corresponds to the normal operating setting. Furthermore, the three-way valve 30 provides a fuel passage between the main storage tank 11 and the fuel filling receptacle 13 when the three way valve 30 is set in the second operating position 35, which here corresponds to the fuel filling setting.

Due to the fluid blocking of non-connected ports, the fluid passage between the main storage tank 11 and fuel filling receptacle 13 is blocked in the first operating position 34, and the fluid passage between the main storage tank 11 and the expansion tank 12 is blocked in the second operating position 35.

An advantage of implementing the valve arrangement 16 as a three-way valve 30 is that essentially no coupling errors can occur, either caused by human error or malfunction of the valves itself. It is impossible to set the valve such that the fuel from the fuel tank 21 is conveyed to the expansion tank during refilling of the main storage tank 11.

In FIG. 3 and FIG. 4, the main storage tank is schematically shown comprising a fuel feed pump 36, a fuel filter 37, a motor 38 for driving the fuel feed pump 36, and an outlet fuel line 25 connected to the main storage tank 11 at a fuel outlet 15. Fuel is sucked into the filter at fuel inlet 39 located close the bottom of the main storage tank 11. Many alternative embodiments for arranging the fuel feed pump 36 and outlet fuel line 25 are possible within the scope of the disclosure.

FIGS. 5 and 6 schematically show similar fuel storage systems as shown in FIGS. 3 and 4, but here instead implemented using two two-way valves 51, 52 as an alternative. Each of the two-way valves is here illustrated as being electrically controlled by an electronic control unit 53, which is connected to each two-way valve 51, 52 by means of signal cables 54. A sensor 83 or similar switch for detecting the presence of the fuel filling nozzle 22 within or near the fuel filling receptacle 13 may be provided adjacent the fuel filling receptacle 13 and being connected to the electronic control unit 53 via a signal cable 56, or the like. A mechanical locking device 82 may additionally be provided adjacent the fuel filling receptacle 13 and connected to the electronic control unit 53 via a further signal cable 58 for selectively locking be fuel filling nozzle 22 in the fuel filling receptacle 13. Other control means could alternatively be used, such as pneumatic control or manual control of the two-way valves 51, 52 and/or the mechanical locking device 82. Furthermore, the sensor as triggering feature may be dismissed with in case some other feature or arrangement is provided as triggering feature for temporarily setting the valve arrangement 16 in the fuel filling setting.

A first two-way valve 51 may be provided in the expansion tank fuel line 14a and a second two-way valve 52 may be provided in the receptacle fuel line 17. A single inlet fuel line 14b may be used from the main storage tank 11 up to a split point 57, at which the single inlet fuel line 14b is split into two fuel lines connected to the individual valve 51, 52.

FIG. 5 illustrates the valve arrangement 16 in the normal operating setting, and FIG. 6 illustrates the valve arrangement 16 in the fuel filling setting. The functionality of the valve arrangement 16 of example embodiment shown in FIGS. 5 and 6 is essentially the same as the functionality described in context of the valve arrangement 16 of FIGS. 3 and 4.

The shown fire storage system of FIGS. 5 and 6 may according to an example embodiment operate substantially automatic by means of the sensor 83 that detects a desire to refuel the main storage tank 11. In response to such detected desire, the electronic control unit 53 control the two two-way control valves 51, 52 such that the valve arrangement 16 is changed from the normal operating setting w the fuel filling setting and the mechanical locking device 82 for securing the fuel filling nozzle 22 to the fuel filling receptacle 13 is activated.

Figure 7:
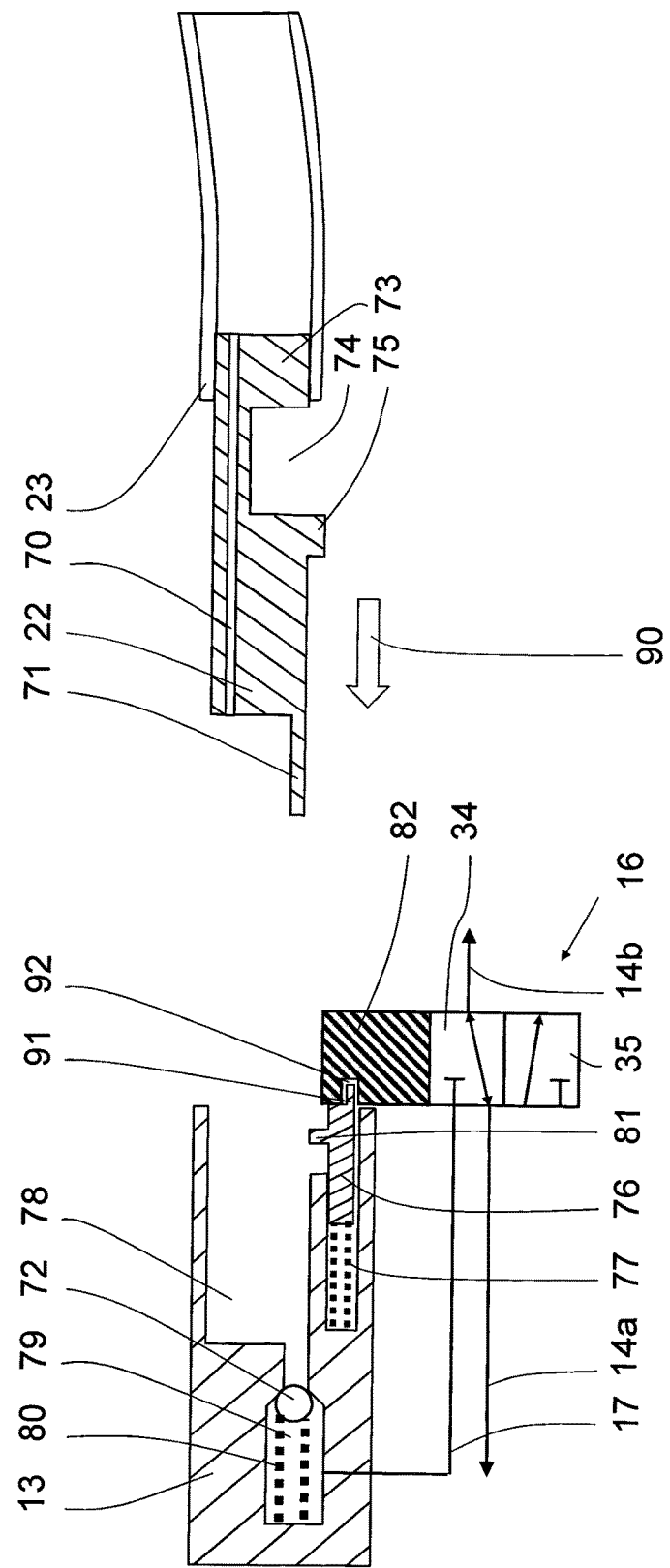
FIG. 7 is a first view of an example embodiment of part of the fuel storage system.

FIG. 7 schematically shows an example embodiment for implementing the fuel filling nozzle 22 with associated fuel filling hose 23, fuel filling receptacle 13 and valve arrangement 16. The fuel filling nozzle 22 comprises an internal flow path 70, and front portion 71 configured to cooperate with a valve member 72 of the fuel filling receptacle 13, a rear portion 73 configured for being connected to the fuel filling hose 23. The fuel filling nozzle 22 further comprises a cavity 74 adapted to cooperate with a mechanical locking device 82 located adjacent the fuel filling receptacle 13 for securing the fuel filling nozzle 22 to the fuel filling receptacle 13.

The fuel filling, nozzle 22 further comprises an abutment 75 configured for cooperation with a locking member 76 of the fuel filling receptacle 13. The locking member 76 is configured for being actuated from a locking position to a release position by the fuel filling nozzle upon insertion thereof in the fuel filling receptacle. This is realised by means of the abutment 75 engaging a first projection 81 of the locking member 76. The locking member 76 is further preloaded towards the locking position by means of resilient means 77, such as a mechanical spring, a coil spring, an elastic member, or the like.

The fuel filling receptacle 13 further comprises an aperture 78 for receiving the fuel filling nozzle 22, and an inlet valve cavity 79 capturing the valve member 72 and a spring 80 preloading the valve member towards a closed position against a seat of the fuel filling receptacle 13. The valve member 72 is here implemented as a ball valve. A receptacle fuel line 17 connects the inlet valve cavity 79 downstream the valve member with the valve arrangement 16.

The mechanical locking device 82 is here merely schematically illustrated as being a member that can move between a release position, as shown in FIG. 7, and locking position in which the mechanical locking device projects into the path of the of the fuel filling nozzle 22 at the location of the cavity 74 when the fuel filling nozzle is properly inserted into the aperture 78.

The locking member 76 is arranged to interact with the mechanical locking device 82 such that mechanical locking device 82 is prevented from entering a locking position unless locking member 76 is set in the release position. This is realised by having the abutment 75 of the fuel filling nozzle engaging the first projection 81 and subsequently pushing the locking member 76 in the direction of insertion 90 of the fuel filling nozzle 22. As a result, a second projection 91 of the locking member disengages a locking recess 92 of the mechanical locking device 82, such that the mechanical locking device is free to move from the release position to the locking position.

Due to the engagement of the second projection 91 of the locking member 76 into the locking recess 92 of the mechanical locking device 82, the mechanical locking device 82 is prevented from entering a locking position unless the fuel filling nozzle is inserted in the fuel filling receptacle to such an extent that the locking member 76 becomes displaced and the second projection 91 exits the locking recess 92. Furthermore, due to a mechanical linking mechanism between the mechanical locking device 82 and the valve arrangement 16, the valve arrangement 16 is also prevented from changing setting from normal operating setting, as shown in FIG. 7, to fuel filing setting unless the fuel filling nozzle is inserted in the fuel filling receptacle.

In the schematic illustration, the mechanical locking device 82 is shown as being directly coupled to the valve arrangement 16, such that motion of the mechanical locking device between its release and locking positions directly results in change of operating position of the valve arrangement 16. The fuel storage system of FIG. 7 consequently comprises a mechanical linking mechanism connecting the mechanical locking device 82 with the valve arrangement 16, such that the actuating position of the mechanical locking device automatically controls the setting of the valve arrangement. For example, the mechanical linking mechanism would automatically set the valve arrangement in the fuel filing setting when the mechanical locking device is set in a locking position, and the mechanical linking mechanism would automatically set the valve arrangement in the normal operating condition when the mechanical locking device is set in a release position. Depending on the configuration with a mechanical linking mechanism this could also be used when the valve arrangement 16 is displaced from the mechanical locking device 82.

The valve arrangement is symbolically shown having two operating positions 34, 35. These operating positions are typically realised by having a moveable valve member (not shown) located in a valve housing for controlling the flow through the valve arrangement. When a mechanical linking mechanism is used this linking mechanism may be directly connected to the moveable valve member. Alternatively, the control of the valve member may be performed electrically or pneumatically.

Figure 8:
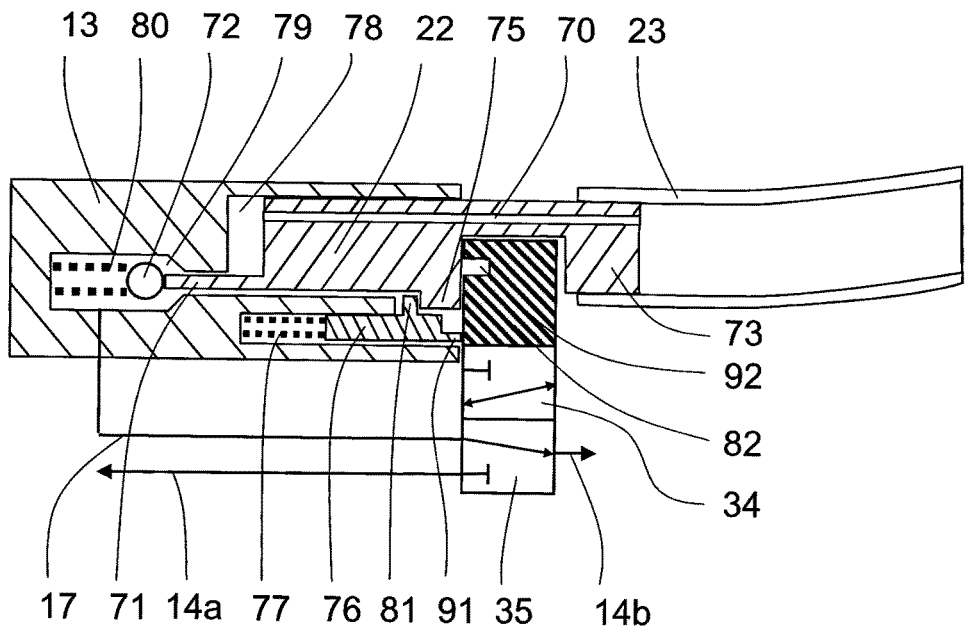
FIG. 8 is a second view of the example embodiment of FIG. 7.

FIG. 8 illustrates the example embodiment of FIG. 7 after insertion of the fuel filling nozzle 22 into the fuel filling receptacle 13 and after moving the mechanical locking device 82 to its locking position. The movement of the mechanical locking device 82 from the release position to the locking position was actually only possible after that the locking member 76 was slidden rearward sufficient to enable the second projection 91 to disengage the locking recess 92. The fuel filling nozzle 22 is consequently locked in coupled position with the fuel filling, receptacle 13. Movement of the mechanical locking device 82 from its release position to its locking position automatically results in the change of operating state of the valve arrangement 16 from the normal operating to the fuel filling setting, in which the expansion tank 12 is isolated and the fuel from the fill station fuel tank is free to flow to the main storage tank 11 via fuel lines 17, 14b. The free flow is also possible due to the opening of the valve member 72 by means of interaction with the front portion 71 of the fuel filling nozzle 22. In this fuel filling state, the fuel filling nozzle removal is disallowed until the mechanical locking device 82 is retracted to the release position and the associated change of the valve arrangement position to the normal operating setting has taken place.

Figure 9:
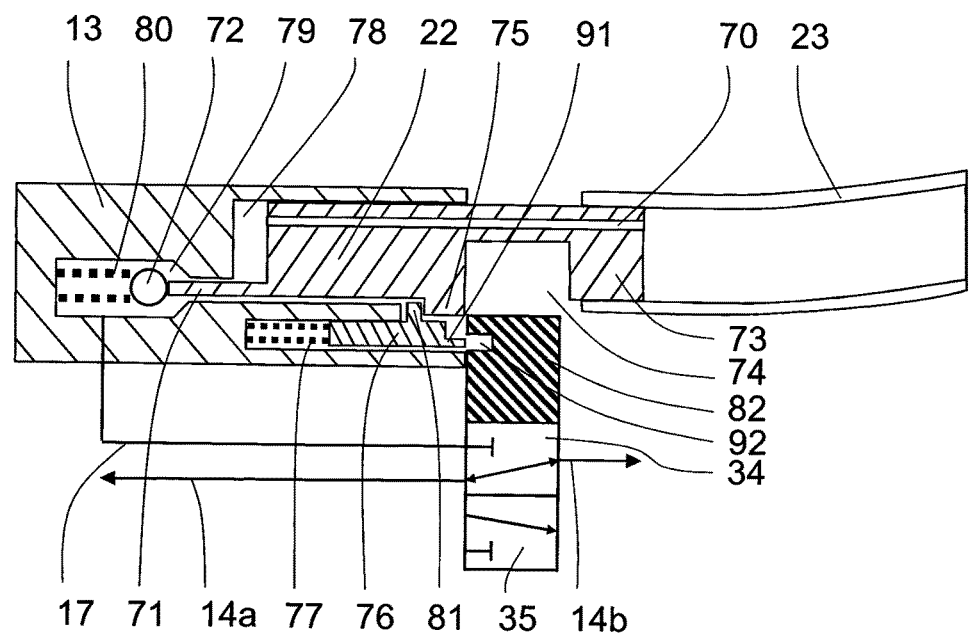
FIG. 9 is a third view of the example embodiment of part of FIG. 7.

FIG. 9 shows a beginning of the disconnection of the fuel filling nozzle from the fuel filling receptacle 13. The mechanical locking device 82 has been retracted to the release position, for example manually or under electrical, hydraulic or pneumatic control, and the fuel flow passage between the expansion tank 12 and main storage tank 11 has consequently been opened due to a functional link, such as mechanical link.

Figure 10:
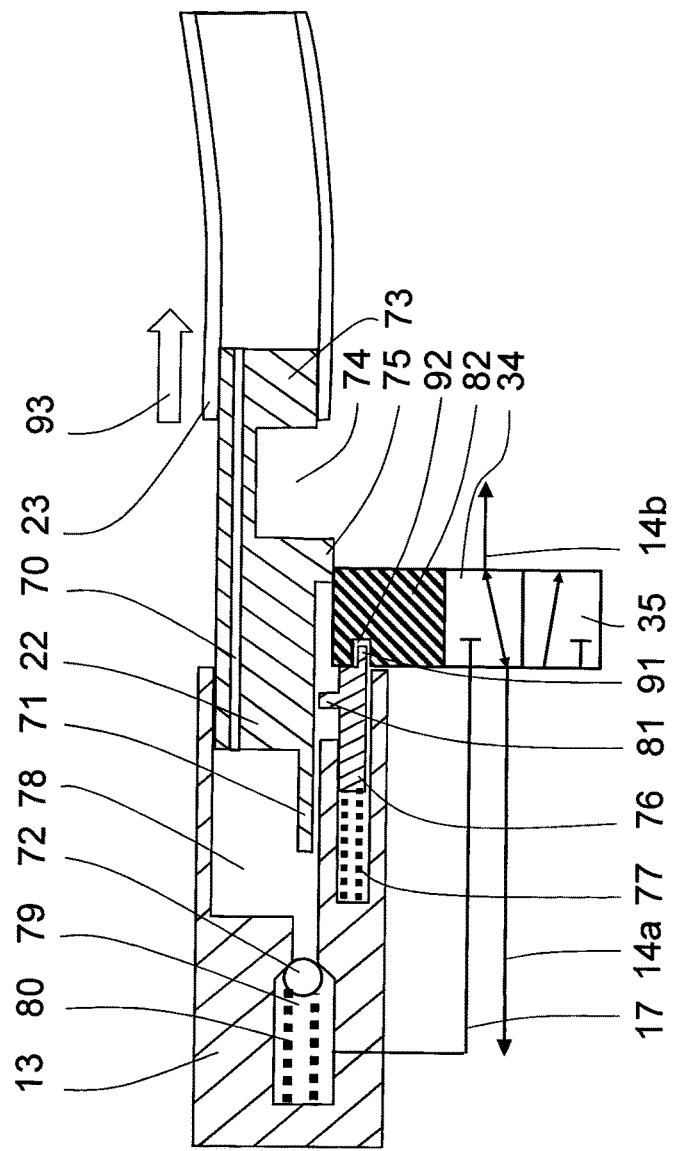
FIG. 10 is a fourth view of the example embodiment of FIG. 7.

FIG. 10 shows a later stage of the disconnection of the fuel filling nozzle from the fuel filling receptacle 13. The fuel filling nozzle has, here been sufficiently retracted in a rearward direction that the locking member 76 again can engage and lock the mechanical locking device 82 in the open state. The fuel flow passage between the expansion tank 12 and main storage tank 11 is still open and then locked in this state due to the functional link.

Figure 11:
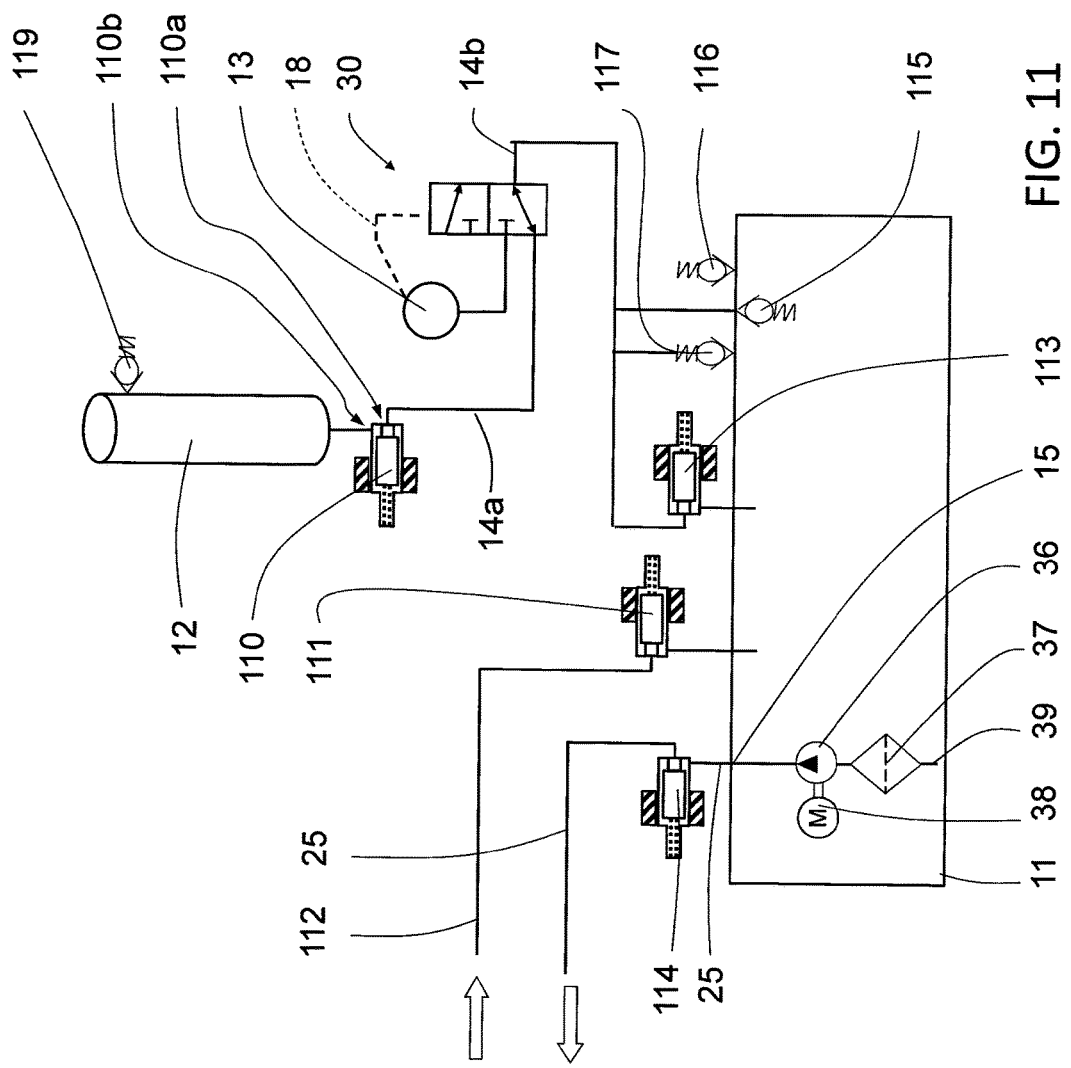
FIG. 11 is a further example embodiment of the fuel storage system.

FIG. 11 shows an example embodiment similar to the embodiment of FIG. 3, and aspects similar in both embodiments will not be described again. The valve arrangement 16 is set in the normal operating setting. The embodiment is FIG. 11 differs in that it comprises a plurality of solenoid shut-off valves 110, 111l, 113, 114, optionally with automatic relief functionality, as well as some safety and/or check valves 115, 116, 117.

For example, a solenoid shut-off valve 110 with or without an automatic relief function is provided in an expansion tank fuel line 14a connecting the valve arrangement 16 and the expansion tank 12.

Additionally or separately, a solenoid shut-off valve 111 with or without automatic relief function is provided in a return fuel line 112 connected to the main storage tank 11 and configured for returning recirculated fuel from a combustion engine 24 into the main storage tank 11.

Additionally or separately, a solenoid shut-off valve 113 with or without automatic relief function is provided in an inlet fuel line 14b connecting the valve arrangement 16 and the main storage tank 11, which inlet fuel line 14b is configured for supplying fuel from the valve arrangement 16 to the main storage tank 11.

Also, a solenoid shut-off valve 114 with or without automatic relief function is provided in the outlet fuel line 25.

The solenoid shut-off valves 110, 111, 113, 114 are typically made of a valve housing having a moveable valve member located therein. The solenoid shut-off valves with an automatic relief function can be designed a normally closed valves, meaning that a compressed mechanical spring typically constantly urges the moveable valve member in a closing direction towards a sealing seat, which here may be designed with soft material for adequate sealing performance. An electromagnetic coil may be provided around the core of the solenoid shut-off valve for urging the valve member to an open state when the coil is electrified.

An example embodiment of a solenoid shut-off valve with automatic relief function typically comprises two fluid connections 110a, 110b, as illustrated with respect to the solenoid shut-off valve 110 in the expansion tank fuel line 14a. A first fluid connection 110a is arranged near the axial end of the valve housing and is arranged such that fluid pressure in a fuel line connected to the first fluid connection 110a exerts a pressure on the moveable valve member in an opening direction, i.e. in the opposite the closing direction. A second fluid connection 110b may be located on a side wall of the valve housing and arranged such that fluid pressure in a fuel line connected to the second fluid connection does not exert any pressure on the moveable valve member in the opening direction or closing direction. The fluid pressure in a fuel line connected to the first fluid connection 110a required to open the valve, against the force of the mechanical spring, corresponds to the relief opening pressure of the valve.

There may also be provided a filling check valve 115 installed in the main storage tank 11 and connected to the inlet fuel line 14b, wherein said filling check valve 115 is adapted to open and increase the filling rate of the main storage tank 11 when the feed pressure in the inlet fuel line 14b exceeds a predetermined level.

There may also be provided a safety valve 116 configured to open and relieve pressure from the main storage tank 11 in case of an emergency when the pressure in the main storage tank 11 exceeds a maximum design limit There may also be provided a check and relief valve 117 installed between the main storage tank 11 and the inlet fuel line 14b connecting the valve arrangement 16 with the main storage tank 11. The check and relief valve 117 is adapted to allow a relief of pressure from the main storage tank 11 at a pressure level below the opening pressure of the safety valve 116. When a check and relief valve 117 is provided at said location the solenoid shut-off valve 113 located in the inlet fuel line 14b can dispense with its automatic relief functionality. Optionally, the relief functionality may be provided by both the check and relief valve 117 and the solenoid shut-off valve 113 in the inlet fuel line 14b.

Also the expansion tank 12 may be provided with a safety relief valve 119 for avoiding risk of damage to the expansion tank 12.

The filling check valve 115, safety valve 116, check and relief valve 117, and safety relief valve 119 may all be designed as check valves having a certain opening pressure determined by a spring urging a valve member in a valve housing towards a sealing seat. The opening pressure of said valves 115, 116, 117, 119 is thus determined by the spring force of the spring.

All solenoid shut-off valves 110, 111, 113, 114, the filling check valve 115, the safety valve 116, the check and relief valve 117, and the safety relief valve 119 are shown in a closed state in FIG. 11. This essentially corresponds to an operating mode where the combustion engine 24 is shut-down and no liquid or vapour fuel should be allowed to escape from the main storage tank 11 or expansion tank 12.

In case of increased fuel temperature during engine stillstand for any reason, such as sunlight on the main storage tank 11, the thermal expansion of the fuel within the main storage tank 11 results in increased pressure within the main storage tank 11. At a certain internal pressure the relief valve 117 will open and enable fuel to flow from the main storage tank 11 into the inlet fuel line 14b and expansion tank fuel line 14a, and subsequently also open the solenoid shut-off-valves 110 in the expansion tank fuel line 14a, enabling fuel to expand into the expansion tank 12. During engine running mode, all solenoid shut-off valves 110, 111, 113, 114 are arranged to be held in open state.

Figure 12:
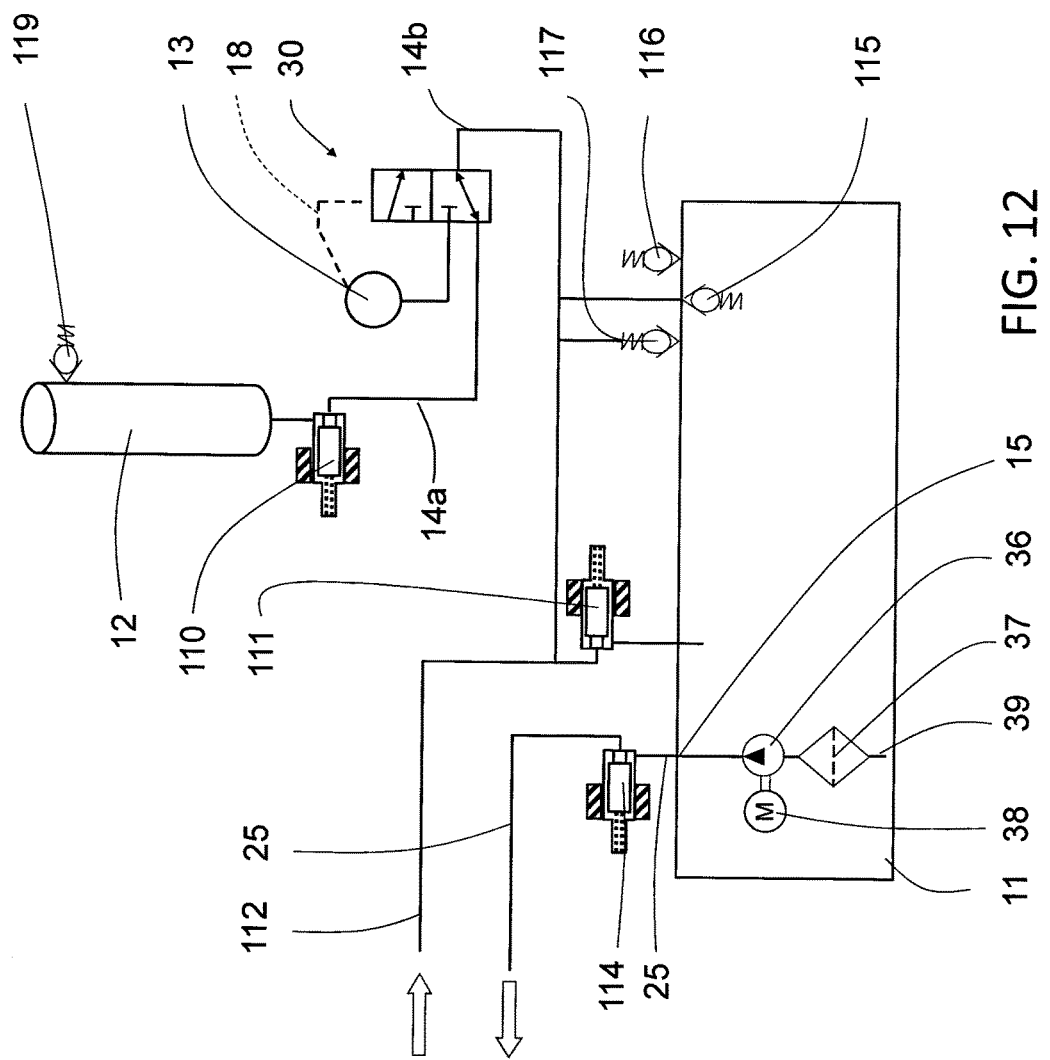
FIG. 12 is a further example embodiment of the fuel storage system.

FIG. 12 shows still an example embodiment where the inlet fuel line 14b connecting the valve arrangement 16 with the main storage tank 11 may be connected to the return fuel line 112 between the return solenoid shut-off valve 111 and the engine. Thereby, a single solenoid shut-off valve 111 and a single tank connection can be used for several different functions, having the supply of fuel to the main storage tank 11 and elimination of leakage from the main storage tank 11 via the solenoid shut-off valve 111 at engine stillstand as common functions.

Moreover, the fuel storage system may alternatively comprise two or more main storage tanks, with said main storage tanks being connected to the same valve arrangement 16.

It should be understood that the optional features described in connection with FIGS. 11 and 12 can be implemented one by one, in isolation from each other, or in various combinations with each other, or all thereof, in combination with the other features of the specification, as described a above with reference to FIG. 1-10.

Figure 13:
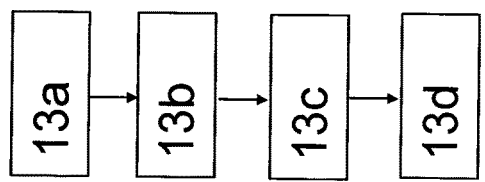
FIG. 13 is a flow chart of an example embodiment of a method.

A method for refuelling a fuel storage system for storing dimethylether (DME), a blend including DME, or other similar highly volatile fuel on a vehicle, will also be briefly described with reference to FIG. 13. The fuel storage system comprises a main storage tank 11, an expansion tank 12, a fuel filling receptacle 13 configured to receive a fuel filling nozzle 22 of a filling station, and a valve arrangement 16 having at least a normal operating setting and a fuel filling setting, wherein the valve arrangement 16 in the normal operating setting provides a fuel passage between the main storage tank 11 and the expansion tank 12, and wherein the valve arrangement 16 in the fuel filling setting both provides a fuel passage between the fuel filling receptacle 13 and the main storage tank 11 and prevents fuel flow between the main storage tank 11 and the expansion tank 12. The method comprises the steps of:

inserting 13a the fuel filling nozzle 22 into the fuel filling receptacle 13;

locking 13b the fuel filling nozzle 22 in the fuel filling receptacle 13, such that the filling nozzle 22 is mechanically prevented from disconnection from the fuel filling receptacle 13, wherein the valve arrangement 16 is automatically set in the fuel filling setting;

refuelling 13c the main storage tank 11 and unlocking and removing 13d the fuel filling nozzle 22 from the fuel filling receptacle 13, wherein the valve arrangement 16 is automatically set, in the normal operating setting.

Because refuelling is performed with the valve arrangement 16 in the fuel filling setting the fluid passage to the expansion tank 12 is closed. Furthermore, the filling check valve 115 is adapted to open and increase the filling rate of the main storage tank 11 when the feed pressure in the inlet fuel line 14b exceeds a predetermined level.

It is to be understood that the present invention is not limited to the example embodiments described above and illustrated in the drawings; rather, the skilled person will recognize that many changes and modifications may be made within the scope of the appended claims.

The invention claimed is:

1. A fuel storage system for storing dimethylether (DME), a blend including DME, or other similar highly volatile fuel on a vehicle, the fuel storage system comprising
   a main storage tank,
   an expansion tank,
   a fuel filling receptacle configured to receive a fuel filling nozzle of a filling station, and
   a valve arrangement having at least a normal operating setting and a fuel filling setting,
   wherein the valve arrangement in the normal operating setting provides a fuel passage between the main storage tank and the expansion tank, and wherein the valve arrangement in the fuel filling setting both provides a fuel passage between the fuel filling receptacle and the main storage tank and prevents fuel flow between the main storage tank and the expansion tank,
   wherein the fuel storage system comprises a mechanical locking device located adjacent the fuel filling receptacle and configured to selectively lock the fuel filling nozzle in the fuel filling receptacle, the mechanical locking device being configured to mechanically prevent disconnection of the fuel filling nozzle from the fuel filling receptacle unless the valve arrangement is in the normal operating setting.

2. Fuel storage system according to claim 1, wherein the valve filling arrangement is prevented from changing setting from normal operating setting to fuel filling setting unless the fuel filling nozzle is inserted in the fuel filling receptacle.

3. Fuel storage system according to claim 1, wherein mechanical locking device controls the setting of the valve arrangement.

4. Fuel storage system according to claim 1, wherein the fuel storage system comprises a mechanical linking mechanism connecting the mechanical locking device with the valve arrangement, such that the actuating position of the mechanical locking device automatically controls the setting of the valve arrangement.

5. Fuel storage system according to claim 4, wherein the mechanical linking mechanism automatically sets the valve arrangement in the fuel filling setting when the mechanical locking device is set in a locking position.

6. Fuel storage system according to claim 4, wherein the mechanical linking mechanism automatically sets the valve arrangement in the normal operating condition when the mechanical locking device is set in a release position.

7. Fuel storage system according to claim 1, wherein the mechanical locking device is prevented from entering a locking position unless the fuel filling nozzle is inserted in the fuel filling receptacle.

8. Fuel storage system according to claim 1, wherein the fuel storage system further comprises a locking member located at the fuel filling receptacle and configured for being actuated from a locking position to an release position by the fuel filling nozzle upon insertion thereof in the fuel filling receptacle, wherein the locking member interacts with the mechanical linking mechanism or the mechanical locking device such that mechanical locking device is prevented from entering a locking position unless locking member is in the release position.

9. Fuel storage system according to claim 8, wherein the locking member is configured for being slidingly moved by the fuel filling nozzle upon insertion thereof in the fuel filling receptacle.

10. Fuel storage system according to claim 8, wherein the locking member is preloaded towards the locking position by means of resilient means.

11. Fuel storage system according to claim 4, wherein the valve arrangement comprises at least one moveable valve member for controlling the flow through the valve arrangement, and the mechanical linking mechanism is connected to the at least one moveable valve member.

12. Fuel storage system according to claim 1, wherein the valve arrangement comprises a three-way valve fluidly connected to the fuel filling receptacle, the main storage tank and the expansion tank, and the three-way valve provides a fuel passage between the main storage tank and the expansion tank in the normal operating setting and a fuel passage between the fuel filling receptacle and the main storage tank in the fuel filling setting.

13. Fuel storage system according to claim 1, wherein the setting of the valve arrangement is configured to be changed manually.

14. Fuel storage system according to claim 1, wherein the fuel storage system further comprises an outlet fuel line connected to a fuel outlet of the main storage tank and configured for supplying fuel to a combustion engine.

15. Fuel storage system according to claim 1, wherein the expansion tank is located higher than the main storage tank for enabling automatic return of fuel from the expansion tank to the main storage tank by means of gravitational force.

16. Fuel storage system according to claim 1, wherein the expansion tank and the main storage tank are physically separate fuel tanks having no common side walls.

17. Fuel storage system according to claim 1, wherein the fuel storage system is configured to store dimethylether (DME) or other similar highly volatile fuel.

18. Fuel storage system according to claim 1, wherein a solenoid shut-off valve with or without automatic relief function is provided in a fuel line connected to the main storage tank and/or the expansion tank.

19. Fuel storage system according to claim 1, wherein a solenoid shut-off valve with or without an automatic relief function is provided in an expansion tank fuel line connecting the valve arrangement and the expansion tank.

20. Fuel storage system according to claim 1, wherein a solenoid shut-off valve with or without automatic relief function is provided in a return fuel line connected to the main storage tank and configured for returning recirculated fuel from a combustion engine into the main storage tank.

21. Fuel storage system according to claim 20, wherein an inlet fuel line configured for supplying fuel from the valve arrangement to the main storage tank is connected to the return fuel line at a location between the solenoid shut-off valve and the engine.

22. Fuel storage system according to claim 1, wherein a solenoid shut-off valve with or without automatic relief function is provided in an inlet fuel line connecting the valve arrangement and the main storage tank, which inlet fuel line is configured for supplying fuel from the valve arrangement to the main storage tank.

23. Fuel storage system according to claim 14, wherein a solenoid shut-off valve with or without automatic relief function is provided in the outlet fuel line.

24. Fuel storage system according to claim 1, wherein the fuel storage system comprises a safety valve configured to open and relieve pressure from the main storage tank to the atmosphere when the pressure in the main storage tank exceeds a predetermined limit.

25. Fuel storage system according to claim 21, wherein the fuel storage system further comprises a check and relief valve connected to the main storage tank and the inlet fuel line, wherein the check and relief valve is adapted to allow a relief of pressure from the main storage tank to the expansion tank.

26. Fuel storage system according to claim 25, wherein the check and relief valve and the solenoid shut-off valve with automatic relief function provided in the expansion tank fuel line are both adapted to allow a relief of pressure from the main storage tank to the expansion tank.

27. Fuel storage system according to claim 25, wherein at least the check and relief valve, and optionally also the solenoid shut-off valve with automatic relief function provided in the expansion tank fuel line, is adapted to allow a relief of pressure from the main storage tank to the expansion tank at a pressure level below an opening pressure of the safety valve.

28. Fuel storage system according to claim 21, wherein the fuel storage system further comprises a filling check valve connected to the inlet fuel line and configured for supplying fuel from the valve arrangement to the main storage tank, wherein the filling check valve is adapted to open and increase the filling rate of the main storage tank when the feed pressure in the inlet fuel line exceeds a predetermined level.

29. Fuel storage system according to claim 1, wherein the fuel storage system comprises at least two main storage tanks, wherein the main storage tanks are connected to the same valve arrangement.

30. Method for refuelling a fuel storage system for storing dimethylether (DME), a blend including DME, or other similar highly volatile fuel on a vehicle, the fuel storage system comprising a main storage tank, an expansion tank, a fuel filling receptacle configured to receive a fuel filling nozzle of a filling station, and a valve arrangement having at least a normal operating setting and a fuel filling setting, wherein the valve arrangement in the normal operating setting provides a fuel passage between the main storage tank and the expansion tank, and wherein the valve arrangement in the fuel filling setting both provides a fuel passage between the fuel filling receptacle and the main storage tank and prevents fuel flow between the main storage tank and the expansion tank, comprising:

inserting the fuel filling nozzle into the fuel filling receptacle;

locking by means of a mechanical locking device the fuel filling nozzle in the fuel filling receptacle, such that the fuel filling nozzle is mechanically prevented from being disconnected from the fuel filling receptacle, wherein the valve arrangement is automatically set in the fuel filling setting;

refuelling the main storage tank;

unlocking the fuel filling nozzle from the fuel filling receptacle by positioning the valve arrangement in the normal operating setting; and removing the fuel filling nozzle from the fuel filling receptacle.

* * * * *

UNITED STATES PATENT AND TRADEMARK OFFICE
CERTIFICATE OF CORRECTION

PATENT NO. : 10,443,546 B2
APPLICATION NO. : 15/524165
DATED : October 15, 2019
INVENTOR(S) : Sergi Yudanov Page 1 of 1

It is certified that error appears in the above-identified patent and that said Letters Patent is hereby corrected as shown below:

In the Claims

In Column 17, Lines 58-59, Claim 2 replace "wherein the valve filling arrangement" with --wherein the valve arrangement--.

Signed and Sealed this
Third Day of December, 2019

Andrei Iancu
*Director of the United States Patent and Trademark Office*